United States Patent
Chen et al.

(10) Patent No.: US 12,087,063 B2
(45) Date of Patent: Sep. 10, 2024

(54) SYSTEMS AND METHODS FOR DETECTING TRAFFIC LIGHTS CORRESPONDING TO A DRIVING LANE

(71) Applicant: Toyota Research Institute, Inc., Los Altos, CA (US)

(72) Inventors: Kun-Hsin Chen, San Francisco, CA (US); Kuan-Hui Lee, San Jose, CA (US); Chao Fang, Sunnyvale, CA (US); Charles Christopher Ochoa, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 364 days.

(21) Appl. No.: 17/731,433

(22) Filed: Apr. 28, 2022

(65) Prior Publication Data
US 2023/0351773 A1    Nov. 2, 2023

(51) Int. Cl.
*G06T 7/70*      (2017.01)
*B60W 60/00*     (2020.01)
(Continued)

(52) U.S. Cl.
CPC ....... *G06V 20/584* (2022.01); *B60W 60/0027* (2020.02); *G06V 10/255* (2022.01); *G06V 20/588* (2022.01); *B60W 2420/403* (2013.01)

(58) Field of Classification Search
CPC .... G06V 20/584; G06V 20/588; G06V 20/56; G06V 10/82; G06V 20/58; G06V 10/454;
(Continued)

(56) References Cited

U.S. PATENT DOCUMENTS

2015/0210278 A1    7/2015    Ben Shalom et al.
2016/0318490 A1*   11/2016   Ben Shalom ...... B60K 31/0008
(Continued)

FOREIGN PATENT DOCUMENTS

CN    110825101 A    2/2020
CN    113366488 A    9/2021
WO    2019162241 A1   8/2019

OTHER PUBLICATIONS

Darrell et al., "Plan-view trajectory estimation with dense stereo background models," Proceedings Eighth IEEE International Conference on Computer Vision, ICCV 2001, vol. 2, pp. 628-635.
(Continued)

*Primary Examiner* — Quan M Hua
(74) *Attorney, Agent, or Firm* — Christopher G. Darrow; Darrow Mustafa PC

(57) ABSTRACT

System, methods, and other embodiments described herein relate to detection of traffic lights corresponding to a driving lane from views captured by multiple cameras. In one embodiment, a method includes estimating, by a first model using images from multiple cameras, positions and state confidences of traffic lights corresponding to a driving lane of a vehicle. The method also includes aggregating, by a second model, the state confidences and a multi-view stereo composition from geometric representations associated with the positions of the traffic lights. The method also includes assigning, by the second model according to the aggregating, a relevancy score computed for a candidate traffic light of the traffic lights to the driving lane. The method also includes executing a task by the vehicle according to the relevancy score.

20 Claims, 5 Drawing Sheets

(51) Int. Cl.
*G06V 10/20* (2022.01)
*G06V 20/56* (2022.01)
*G06V 20/58* (2022.01)

(58) Field of Classification Search
CPC .. G06V 20/582; G06V 10/811; G06V 30/194; G06V 10/764; G06V 20/54; G06V 10/809; G08G 1/0112; G08G 1/09623; G08G 1/096725; G08G 1/167; G08G 1/166; G08G 1/22; G08G 1/07; G08G 1/096811; G08G 1/096844; G08G 1/0116; G08G 1/0145; G08G 1/096861; G08G 1/0133; G08G 1/096741; G08G 1/096775; G08G 1/096791; G08G 1/005; G05D 1/0214; G05D 1/0246; G05D 1/0088; G05D 1/0287; G05D 1/0221; G05D 1/0278; G05D 1/0212; G06N 20/00; G06N 7/01; G06N 3/08; G06N 3/045; G06N 5/01; G06N 3/044; G06N 3/006; G06F 18/24133; G06F 18/2415; G06F 18/25; G06F 18/256; G06F 16/29; G06F 2218/12; G06T 2207/30252; G06T 2207/20081; G06T 19/006; G06T 13/80; G06T 2207/20084; G06T 2207/10024
See application file for complete search history.

(56) References Cited

U.S. PATENT DOCUMENTS

| | | | |
|---|---|---|---|
| 2021/0094577 A1* | 4/2021 | Shalev-Shwartz | ................... B60W 30/181 |
| 2021/0342609 A1 | 11/2021 | Smolyanskiy et al. | |
| 2021/0352259 A1 | 11/2021 | Jiang et al. | |
| 2023/0117357 A1* | 4/2023 | Heitzmann | ........ G01C 21/3811 382/103 |

OTHER PUBLICATIONS

Liu et al., "Deep Fitting Degree Scoring Network for Monocular 3D Object Detection," Proceedings of the IEEE/CVF Conference on Computer Vision and Pattern Recognition (CVPR), 2019, pp. 1057-1066.

Wang et al., "Object DGCNN: 3D Object Detecting using Dynamic Graphs," 35th Conference on Neural Information Processing Systems, 2021, pp. 1-14.

Zeng et al., "Learning Skeletal Graph Neural Networks for Hard 3D Pose Estimation," Proceedings of the IEEE/CVF International Conference on Computer Vision (ICCV), 2021, pp. 11436-11445.

Peng et al., "3D Object Detection Combining Semantic and Geometric Features from Point Clouds," arXiv:2110.04704, 2021, pp. 1-12.

Patrick Langechuan Liu, "Monocular 3D Object Detection in Autonomous Driving—A Review," Nov. 26, 2019, 34 pages, found at https://towardsdatascience.com/monocular-3d-object-detection-in-autonomous-driving-2476a3c7f57e.

Ezeddin Al Hakim, "3D: YOLO: End-to-End 3D Object Detection Using Point Clouds," Stockholm, Sweden, 2018, 58 pages.

Weng et al., "AutoSelect: Automatic and Dynamic Detection Selection for 3D Multi-Object Tracking," arXiv:2012.05894, Dec. 10, 2020, pp. 1-7.

Wang et al., "Monocular Plan View Networks for Autonomous Driving," 2019 IEEE/RSJ International Conference on Intelligent Robots and Systems (IROS), 2019, pp. 2876-2883.

Hsu et al., "Multi-Target Multi-Camera Tracking of Vehicles using Metadata-Aided Re-ID and Trajectory-Based Camera Link Model," in IEEE Transactions on Image Processing, vol. 30, 2021, pp. 5198-5210.

Chen et al., "Accurate and Reliable Detection of Traffic Lights Using Multiclass Learning and Multiobject Tracking," in IEEE Intelligent Transportation Systems Magazine, vol. 8, No. 4, 2016, pp. 28-42.

* cited by examiner

SYSTEMS AND METHODS FOR DETECTING TRAFFIC LIGHTS CORRESPONDING TO A DRIVING LANE

TECHNICAL FIELD

The subject matter described herein relates, in general, to detecting traffic lights, and, more particularly, to detecting traffic lights that correspond to a driving lane from views captured by multiple cameras and modeling that avoids using map data.

BACKGROUND

Various systems within a vehicle process data from positioning and other sensors for performing navigation, motion planning, and other tasks. Navigation may involve various tasks by a tracking system including coordination with other systems, such as an automated driving system (ADS), for operator assistance. For example, guiding a vehicle through an intersection can involve operations by vehicle systems that use map and sensor data. Furthermore, a machine learning (ML) model for the ADS may help assist with driving tasks through the intersection by perceiving objects and motion planning. This assistance from the ADS can increase safety and comfort for an operator.

In one approach, vehicle systems use high-definition (HD) map data for assisting an operator approaching an intersection. Fine details in HD map data can increase the accuracy of tasks computed by vehicle systems, thereby improving safety. However, vehicle systems (e.g., an ADS) that rely on HD map data can cause increases in computational costs and complexity as a trade-off. In addition, HD map data is sometimes unavailable or stale for a geographic area. The unavailability of operator assistance systems because of missing HD map data can create unsafe scenarios, particularly for risky encounters through intersections.

SUMMARY

In one embodiment, example systems and methods relate to improving the detection of traffic lights corresponding to a driving lane from views captured by multiple cameras. In various implementations, systems assisting a vehicle maneuver through an intersection detect traffic lights by utilizing map and sensor data. The reliance on map data can increase computational costs for vehicle systems from added complexity. In particular, high-definition (HD) map data increases computation costs to vehicle systems from geographic details within the HD map data. Furthermore, the unavailability of map data in certain regions impacts the safety for assistance systems relying on the map data. Therefore, in one embodiment, a detection system uses a first model (e.g., neural network) that estimates orientations and three-dimensional (3D) locations of traffic lights relative to a driving lane (e.g., ego lane) of a vehicle within images from multiple cameras. The images may include various views of traffic lights that are occluded by objects (e.g., vehicles). The detection system combines the images to reduce occlusion effects for detecting the traffic lights. In particular, the detection system may aggregate state information and a multi-view composition derived from the orientations and the 3D locations of the traffic lights using a second model (e.g., a structure from motion (SFM) network).

Moreover, the detection system may assign a relevancy score that is computed for a candidate traffic light associated with the driving lane using predictions. In particular, computations involving the assignment may incorporate aggregation of the estimated state confidence and a multi-view stereo composition using the second model. Accordingly, the detection system processes multiple images representing different views and uses multiple models for accurately scoring relevant traffic lights that avoids using map data, thereby reducing complexity and improving the availability of assistance systems.

In one embodiment, a detection system for the detection of traffic lights corresponding to a driving lane from views captured by multiple cameras is disclosed. The detection system includes a processor and a memory storing instructions that, when executed by the processor, cause the processor to estimate, by a first model using images from multiple cameras, positions and state confidences of the traffic lights corresponding to the driving lane of a vehicle. The instructions also include instructions to aggregate, by a second model, the state confidences and a multi-view stereo composition from geometric representations associated with the positions of the traffic lights. The instructions also include instructions to assign, by the second model according to the aggregation, a relevancy score computed for a candidate traffic light of the traffic lights to the driving lane. The instructions also include instructions to execute a task by the vehicle according to the relevancy score.

In one embodiment, a non-transitory computer-readable medium for the detection of traffic lights corresponding to a driving lane from views captured by multiple cameras and including instructions that when executed by a processor cause the processor to perform one or more functions is disclosed. The instructions include instructions to estimate, by a first model using images from multiple cameras, positions and state confidences of traffic lights corresponding to a driving lane of a vehicle. The instructions also include instructions to aggregate, by a second model, the state confidences and a multi-view stereo composition from geometric representations associated with the positions of the traffic lights. The instructions also include instructions to assign, by the second model according to the aggregation, a relevancy score computed for a candidate traffic light of the traffic lights to the driving lane. The instructions also include instructions to execute a task by the vehicle according to the relevancy score.

In one embodiment, a method for detecting traffic lights corresponding to a driving lane from views captured by multiple cameras is disclosed. In one embodiment, the method includes estimating, by a first model using images from multiple cameras, positions and state confidences of traffic lights corresponding to a driving lane of a vehicle. The method also includes aggregating, by a second model, the state confidences and a multi-view stereo composition from geometric representations associated with the positions of the traffic lights. The method also includes assigning, by the second model according to the aggregating, a relevancy score computed for a candidate traffic light of the traffic lights to the driving lane. The method also includes executing a task by the vehicle according to the relevancy score.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed herein associated with improving the detection of traffic lights corresponding to a driving lane and modeling that avoids using map data. In various implementations, vehicle systems use map and sensor data to maneuver through an intersection by detecting traffic lights. However, processing map data by perception systems can increase computational costs. In particular, high-definition (HD) map data increases computational costs from processing associated with geometric and three-dimensional (3D) details that form the HD map data. As previously explained, assistance systems relying on map data also encounter difficulties due to availability or data staleness in certain areas (e.g., rural areas). Therefore, in one embodiment, a detection system uses a first model (e.g., neural network (NN), convolutional NN (CNN), etc.) to estimate attributes of traffic lights from various views captured by multiple cameras. For instance, the attributes reflect the positioning of the traffic lights (e.g., multi-lamp signals, railroad signals, crosswalk signals, etc.), such as orientations and 3D locations derived and predicted individually for each camera or view. Furthermore, the detection system may compute state confidences indicating probabilities associated with colors and shapes for the traffic lights. Here, a color can reflect that a traffic light is signaling red and a shape reflects that the traffic light housing is rectangular.

Regarding further processing, the detection system uses a second model (e.g., perceptron, geometry model, etc.) that aggregates the state confidences and a multi-view stereo composition from geometric representations associated with the positions of the traffic lights derived using multiple images. Here, the geometries can indicate an angle between the traffic lights and the vehicle relative to the driving lane independent of map data. The second model uses the aggregation operation to assign a relevancy score computed for a candidate traffic light corresponding to the driving lane. This may involve the second model forming geometric inferences or predictions between the depth and the orientation information derived from detected attributes. Accordingly, the detection system uses multi-stage modeling of multiple views to derive geometric relations and relevancy between traffic lights and a corresponding driving lane independent of map data, thereby improving accuracy and robustness.

Figure 1:
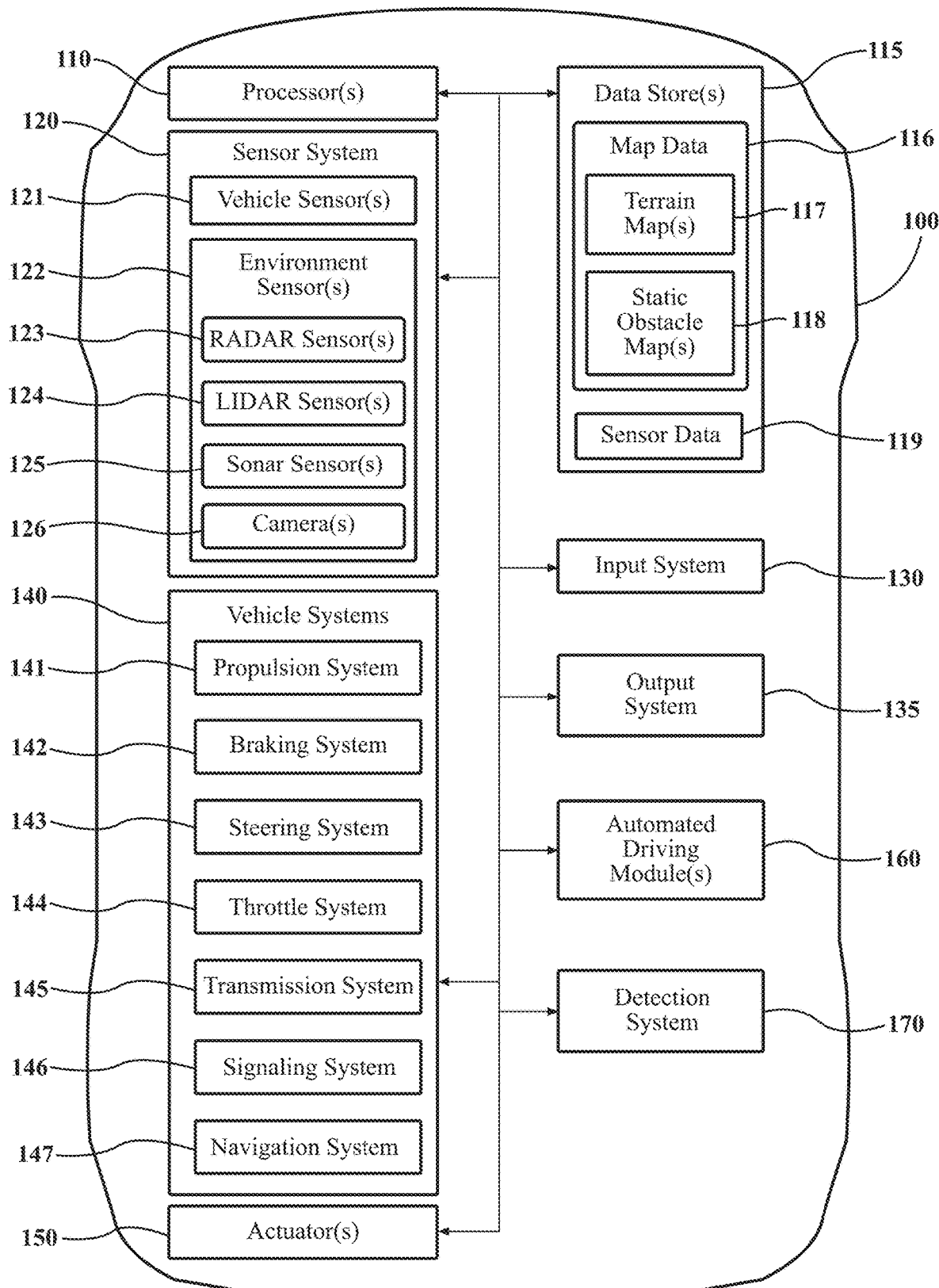
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a detection system uses road-side units (RSU), consumer electronics (CE), mobile devices, robots, drones, and so on that benefit from the functionality discussed herein associated with the detection of traffic lights corresponding to a driving lane using images from various views and modeling that avoids using map data.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a detection system 170 that is implemented to perform methods and other functions as disclosed herein relating to improving the detection of traffic lights corresponding to a driving lane using images from various views and modeling that avoids using map data.

Figure 2:
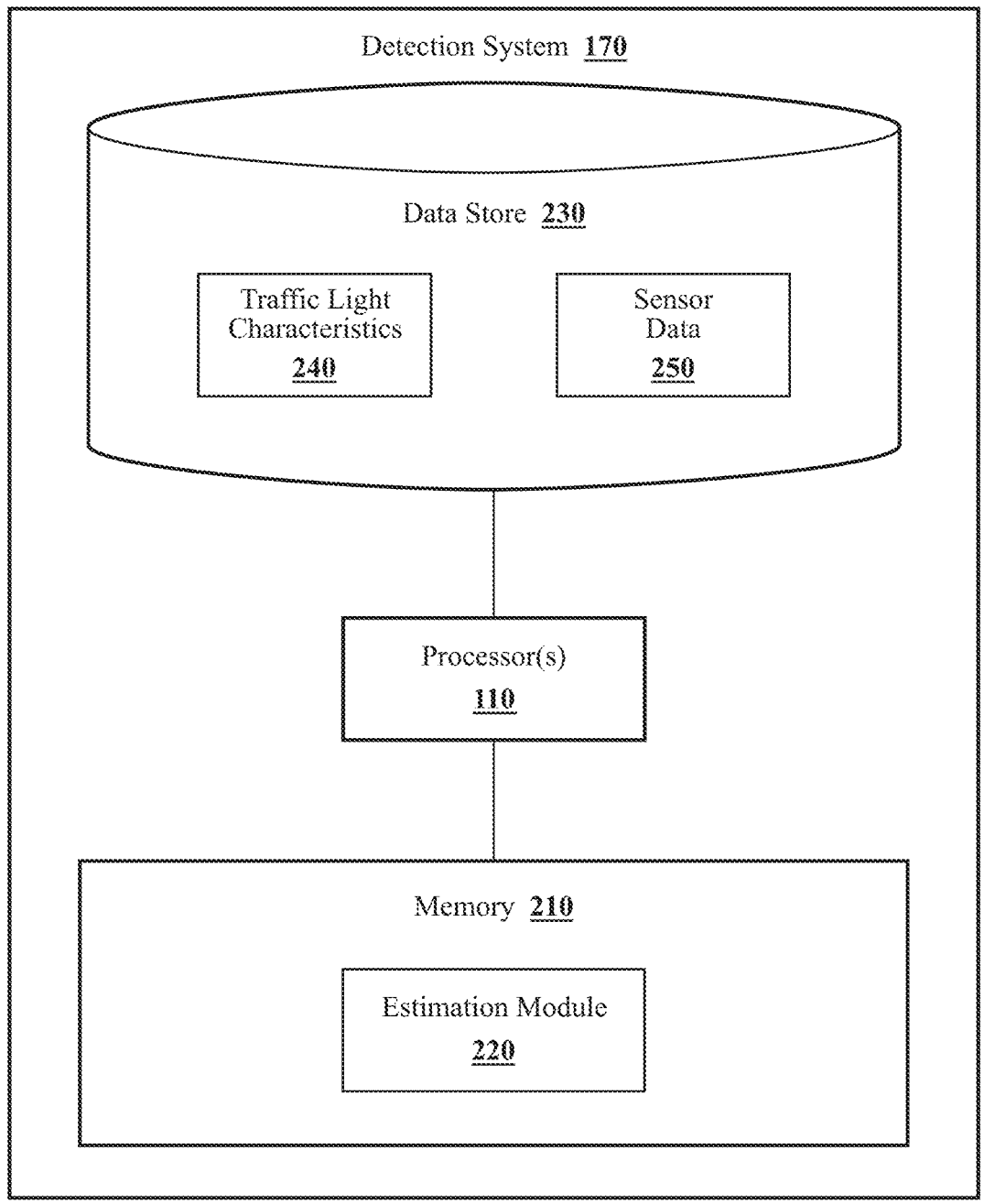
FIG. 2 illustrates one embodiment of a detection system that is associated with the detection of traffic lights corresponding to a driving lane using multiple cameras.

With reference to FIG. 2, one embodiment of the detection system 170 of FIG. 1 is further illustrated. The detection system 170 is shown as including a processor(s) 110 from the vehicle 100 of FIG. 1. Accordingly, the processor(s) 110 may be a part of the detection system 170, the detection system 170 may include a separate processor from the processor(s) 110 of the vehicle 100, or the detection system 170 may access the processor(s) 110 through a data bus or another communication path. In one embodiment, the detection system 170 includes a memory 210 that stores an estimation module 220. The memory 210 is a random-access memory (RAM), a read-only memory (ROM), a hard-disk drive, a flash memory, or other suitable memory for storing the estimation module 220. The estimation module 220 is, for example, computer-readable instructions that when executed by the processor(s) 110 cause the processor(s) 110 to perform the various functions disclosed herein.

Moreover, the estimation module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the estimation module 220, in one embodiment, acquires the sensor data 250 that includes at least camera images. A camera may be a high-resolution camera, a low-resolution camera, a fish-eye camera, a side-view camera, a red/green/blue (RGB) camera, and so on that may have various field-of-views (FOV). In further arrangements, the estimation module 220 acquires the sensor data 250 from further sensors such as radar sensors 123, a LIDAR sensors 124, and other sensors as may be suitable for identifying vehicles and locations of the vehicles.

Accordingly, the estimation module 220, in one embodiment, controls the respective sensors to provide the data inputs in the form of the sensor data 250. Additionally, while the estimation module 220 is discussed as controlling the various sensors to provide the sensor data 250, in one or more embodiments, the estimation module 220 can employ other techniques to acquire the sensor data 250 that are either active or passive. In addition, the estimation module 220 can undertake various approaches to fuse data from multiple sensors when providing the sensor data 250 and/or from sensor data acquired over a wireless communication link.

Moreover, in one embodiment, the detection system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the estimation module 220 in executing various functions. In one embodiment, the data store 230 includes the sensor data 250 along with, for example, metadata that characterizes various aspects of the sensor data 250. In one embodiment, the data store 230 further includes the traffic light characteristics 240 that specify housing shapes, types, bulb quantities, bulb shapes, mounting type (e.g., cable, pole, etc.) and so on of traffic lights. Here, types of traffic lights may include multi-lamp signals, railroad signals, crosswalk signals, and so on.

The estimation module 220, in one embodiment, is further configured to perform additional tasks beyond controlling the respective sensors to acquire and provide the sensor data 250. For example, the estimation module 220 includes instructions that cause the processor 110 to estimate positions and state confidences of the traffic lights corresponding to the driving lane of the vehicle 100 using a first model (e.g., NN, CNN, etc.). Here, multiple cameras from the vehicle 100 can capture different views of traffic lights at substantially the same moment. As explained in detail below, the orientation and 3D location of a traffic light vary relative to the camera used by the detection system 170. Furthermore, using multiple cameras improves the robustness of the detection system 170 since a traffic light can be occluded by an object depending on a view. The detection system 170 also improves detection by relying on cameras with different FOVs (e.g., a fish-eye camera). For example, one camera captures an image showing a top half of a traffic light due to an occluding vehicle or tree, whereas another camera captures the entire side. Regarding the state confidences, these computations can indicate probabilities of colors and shapes associated with the traffic lights. For instance, a color can reflect that a traffic light is signaling red and a shape reflects that the traffic light housing is rectangular.

In one approach, the detection system 170 uses a second model (e.g., perceptron, geometry model, etc.) to aggregate or consolidate state confidences and a multi-view stereo composition from geometric representations associated with the positions of the traffic lights. In particular, the multi-view stereo computations may involve the detection system 170 constructing geometries in a 3D space through meshing. For instance, various bounding boxes for a traffic light within captured images are identified by the detection system 170. Information associated with the bounding boxes can include X-Y position, height (h), width (w), and depth (d) geometries for a detected traffic light within a captured image. The detection system 170 can mesh these bounding boxes using the second model through a structure from motion (SFM) learner. This may involve feature matching keypoints (i.e., interest points) associated with a traffic light. A keypoint may be a bulb, corner, housing protrusion, and so on of a traffic light. In this way, 3D structures of traffic lights are derived from the bounding box computations. Furthermore, the detection system 170 uses the second model to assign a relevancy score computed for a candidate traffic light for the driving lane according to the aggregation results and predictions involving geometries.

In various implementations, a relevancy score may be an index (e.g., 1-10), a percentage, a scale (0-1), and so on that the detection system 170 computes according to predictions. The relevancy score indicates the importance of an upcoming traffic light detected corresponding to the driving lane of the vehicle 100. In one approach, the traffic light is scored entirely rather than by bulb. For instance, an entire traffic light may include the bulb housing, support pole, support cable, and so on associated with the traffic light structure. Furthermore, the relevancy score can be aggregated so that the score reflects a number (e.g., 2 or 3) of traffic lights relevant to the driving lane. In one approach, the detection system 170 identifies two traffic lights from processed images captured by multiple cameras. The first traffic light may be scored a 0.9 and the second traffic light 0.1. As such, the first traffic light may be most relevant for the vehicle 100.

Figure 3:
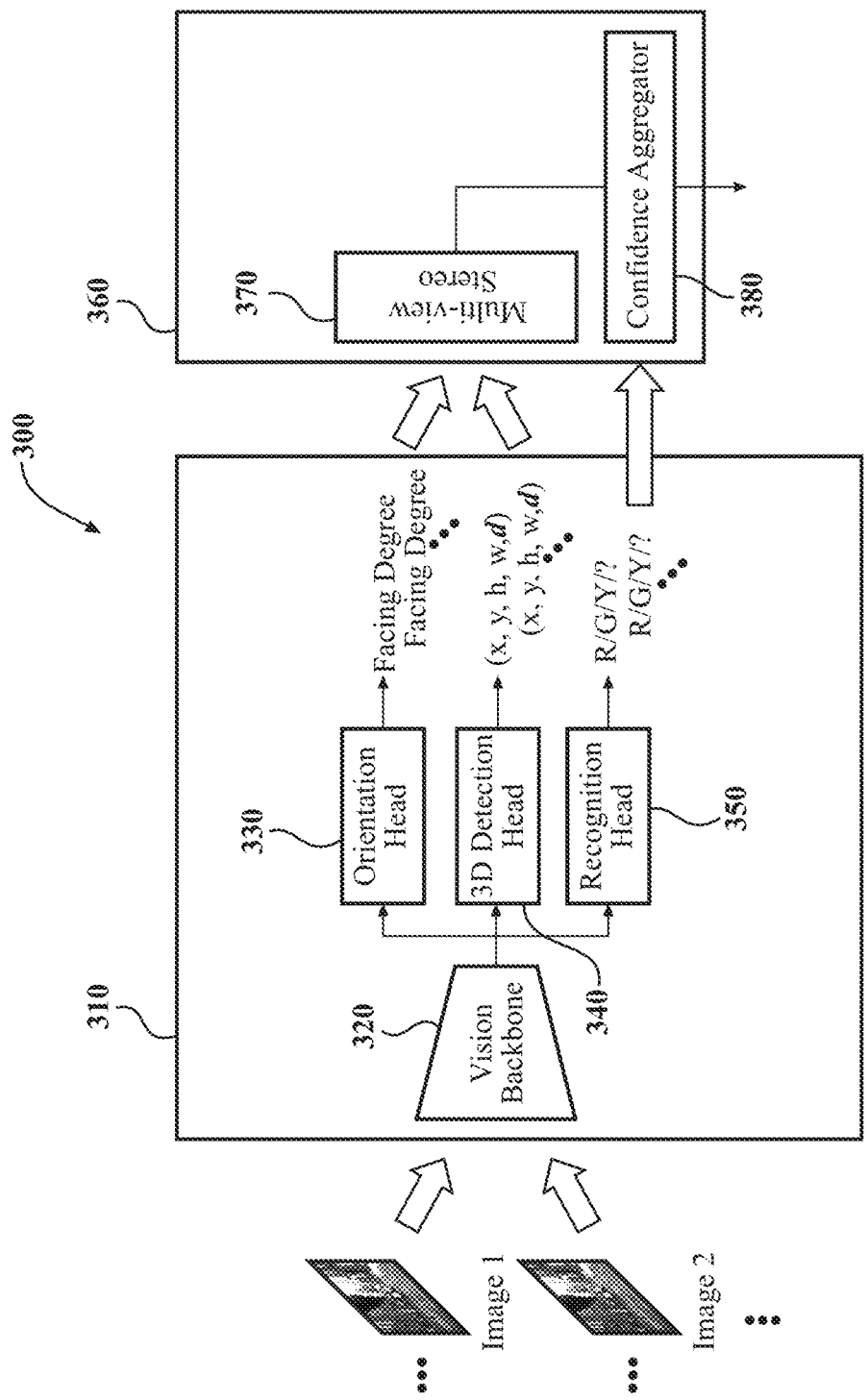
FIG. 3 illustrates one embodiment of the detection system of FIG. 2 using an encoder and decoders that predict the relevancies of traffic lights corresponding to the driving lane using various views.

Turning now to FIG. 3, one embodiment of the detection system 170 of FIG. 2 using an encoder and decoders 300 that detect the relevancies of traffic lights corresponding to the driving lane is illustrated. A first model 310 includes an encoder 320 that can be a vision backbone for detecting object features or attributes from multiple images taken from various cameras. In one approach, the first model 310 performs computations individually on data from each camera, such as to have uncorrelated predictions. The output of the encoder 320 is fed to multiple heads in parallel that decode the features or attributes for forming predictions. Here, the orientation head 330 may decode the output of the encoder 320 to estimate degrees (e.g., facing degree) between the vehicle 100 and objects (e.g., traffic lights) relative to a driving lane for one or more images camera-by-camera. As illustrated below, a facing degree can represent a geometric measurement between a camera or the vehicle 100 in a driving lane relative to one or more traffic lights. For instance, an orientation of 0 or 90 degrees reflects that one or more traffic lights is directly associated with the current driving lane for the vehicle 100. On the contrary, an orientation of 135 or 45 degrees may reflect that one or more traffic lights are associated with other lanes and less relevant to the vehicle 100.

Moreover, the 3D detection head 340 decodes the features from the encoder 320 to detect traffic lights. Here, a traffic light can be identified by the geometries of a bounding box for an image. Computed information associated with a bounding box can include X-Y position, h, w, and d geometries for a detected traffic light within a captured image from a respective camera. Regarding additional detection tasks, the first model 310 includes the recognition head 350 that determines the states of potential traffic lights from various images. For example, the recognition head 350 decodes the output of encoder 320 and outputs red, green, yellow, symbol (e.g., arrow), and so on information. Furthermore, an associated confidence score for potential traffic lights within the image can also form part of the information. Thus, the detection system 170 can output a state confidence indicating probabilities of a color and a shape for a light cover, bulb, housing, and so on associated with the traffic lights.

In various implementations, the second model 360 can perform various tasks, such as projecting outputs from the first model 310 using the multi-view stereo process 370. For example, 2D detections or 3D locations computed by the first model 310 are projected to a 3D space using multi-view geometry captured by the cameras. Here, bounding boxes outputted by the first model 310 can be meshed by the second model 360 using a SFM learner, such as by feature matching keypoints (i.e., interest points) associated with a traffic light. A keypoint may be a bulb, corner, housing protrusion, and so on of a traffic light. For example, the multi-view stereo process 370 accurately estimates the 3D space using at least three bounding boxes and related depth information detected by the first model from various images. Furthermore, confidence levels for traffic lights may be outputted by the multi-view stereo process 370 to the confidence aggregator 380.

Regarding the output of the second model 360, the confidence aggregator computes a relevancy score using one or more confidence levels from the multi-view stereo process 370 and confidence scores from the recognition head 350 for one or more traffic lights. In various implementations, the multi-view stereo process 370 and the confidence aggregator 380 are combined instead of operating as subnetworks and output the relevancy score using the orientation information, the 3D detection information, and the confidence scores from the first model 310. This may simplify model architecture in certain applications. Notwithstanding, the relevancy score may indicate which traffic light is most relevant to the vehicle 100 and an associated state. For example, a score is that the green traffic light to the left of the vehicle 100 has a 75% chance of being the most relevant. In the same traffic scene, a red traffic light corresponding to the driving lane has a 50% chance of being the most relevant. Here, the detection system 170 may compute these scores since the vehicle 100 is moving between lanes.

In various implementations, the detection system 170 executes 3D maximum suppression to remove detections that have lower confidence or relevancy. This may be performed by the second model 360 as part of the aggregation or consolidation of outputs from the first model 310. For example, an image having a traffic light occluded by a truck may be assigned a reduced confidence score according to predictions by the detection system 170. In one approach, the reduced confidence score outputted by a multi-view process is removed by the second model 360 instead of aggregated by the confidence aggregator 380. This may increase the reliability of the relevancy score since the confidence aggregator 380 relies on quality detections. A confidence score may particularly be dropped when a state confidence of the image from recognition also outputs a reduced value.

Figure 4:
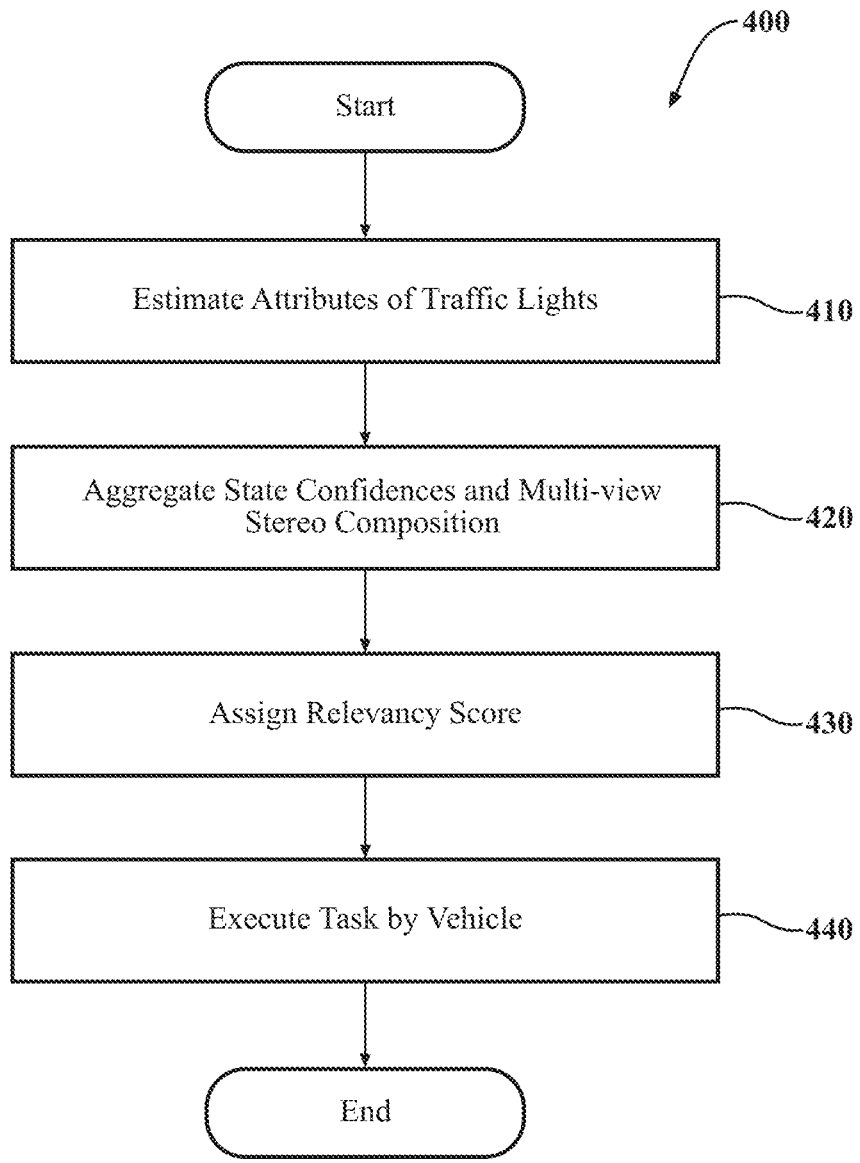
FIG. 4 illustrates one embodiment of a method that is associated with identifying traffic lights corresponding to the driving lane by computing a relevancy score.

Turning now to FIG. 4, a flowchart of a method 400 that is associated with improving the detection of traffic lights corresponding to a driving lane using images from various views and modeling that avoids using map data is illustrated. Method 400 will be discussed from the perspective of the detection system 170 of FIGS. 1 and 2. While method 400 is discussed in combination with the detection system 170, it should be appreciated that the method 400 is not limited to being implemented within the detection system 170 but is instead one example of a system that may implement the method 400.

At 410, the estimation module 220 estimates attributes of traffic lights. For example, an encoder processes multiple images of a traffic scene captured by multiple cameras of the vehicle 100. As previously explained, the multiple images allow the detection system 170 to view a candidate traffic light from various angles, thereby reducing the effects of occlusions. For instance, one camera captures an image showing a top half of a traffic light due to an occluding vehicle or tree, whereas another camera captures the entire side. Furthermore, the encoder may be part of a first model (e.g., NN, CNN, etc.) that detects salient features of traffic lights, vehicles, pedestrians, and so on within the traffic scene. Here, the first model may perform predictions using data from each camera individually so that multiple views are factored. Furthermore, in one approach, the encoder is a vision backbone that extracts attributes according to a base classification (e.g., traffic light). For instance, attributes can be color, bulb shape, mounting type, and so on of a traffic light.

At 420, the detection system 170 aggregates state confidences and a multi-view stereo composition derived from the multiple images. Here, a second model (e.g., perceptron, geometry model, etc.) may aggregate or consolidate the state confidences and the multi-view stereo composition from geometric representations of positions associated with the traffic lights. In particular, decoders process the output of the encoder in parallel to estimate orientations and 3D locations from the images using the first model. For instance, an orientation head estimates degrees (e.g., facing degree) between the vehicle 100 and the traffic lights relative to a driving lane from multiple images. As previously explained, a facing degree represents a geometric measurement between a camera or the vehicle 100 in a driving lane relative to one or more traffic lights. For instance, an orientation of 0 or 90 degrees reflects that traffic lights are directly associated with the driving lane. On the contrary, an orientation of 135 or 45 degrees may reflect that traffic lights are associated with other driving lanes for the vehicle 100.

Moreover, the detection system 170 can construct geometries in a 3D space by meshing, such as by using the 3D locations, to improve relevancy computations. For instance, the detection system 170 identifies one or more bounding boxes for a traffic light within captured images. As previously explained, information associated with the bounding boxes can include X-Y position, h, w, and d geometries for a detected traffic light associated with a captured image. The detection system 170 can mesh these bounding boxes using the second model and a SFM learner. For example, feature matching of keypoints (i.e., interest points) associated with a traffic light is estimated by the detection system 170. Here, a keypoint may be a bulb, corner, housing protrusion, and so on of a traffic light. In this way, 3D structures of traffic lights are derived from the bounding box computations that can improve confidence or relevancy computations.

Furthermore, a second model can project outputs from the first model using the multi-view stereo processing. For example, 2D or 3D information computed by the first model are projected to a 3D space, such as by the meshing of bounding boxes outputted by the first model. This may involve the multi-view processing estimating the 3D space using at least three bounding boxes and related depth information detected by the first model from various images. As such, the detection system 170 can use the projection in the 3D space to distinguish between different traffic lights within a scene.

In addition, a recognition head may determine the states of potential traffic lights from images captured by various cameras. Here, the recognition head can decode the output of the encoder and output red, green, yellow, symbol (e.g., arrow), and so on information and an associated confidence score for potential traffic lights. In this way, the detection system 170 outputs a state confidence or confidence levels indicating probabilities of a color and a shape for a light cover, bulb, housing, and so on associated with the traffic lights from various images.

At 430, the detection system 170 assigns relevancy scores computed by the second model for one or more traffic lights. A relevancy score may be an index (e.g., 1-10), a percentage, a scale (0-1), and so on, indicating the importance of an upcoming traffic light corresponding to the driving lane of the vehicle 100. In one approach, the traffic light is scored entirely rather than by bulb. For instance, an entire traffic light may include the bulb housing, support pole, support cable, and so on associated with the traffic light structure. In various implementations, the detection system 170 identifies two traffic lights for simplicity from processed images captured by multiple cameras. The first traffic light may be scored a 0.9 and the second traffic light 0.1. As such, the first traffic light may be most relevant for the vehicle 100.

In various implementations, the detection system 170 executes maximum suppression of objects within a 3D space. This may be performed by the second model as part of the aggregation or consolidation of outputs from the first model. Here, the detection system 170 may select confidence or relevancy scores of duplicate objects (e.g., traffic lights) in a 3D space according to criteria. For example, traffic lights having a computed relevancy score above 8 may be relevant to a current driving lane. In this way, the detection system 170 removes detections that have lower confidence levels. For instance, an image having a traffic light occluded by a tree may be assigned a reduced confidence score. As a result, another traffic light is assigned as the candidate traffic light for the driving lane. In this way, the detection system 170 adapts to provide more accurate relevancy scores for execution by downstream tasks.

Regarding further processing, at 440 the detection system 170 communicates the relevancy score to another system of the vehicle 100 for executing a task. The task may be utilized by downstream processes, such as object detection, object tracking, motion planning, and so on. For example, the detection system 170 computes a relevancy score of 8 for a candidate traffic light that is red at 0 degrees to the vehicle 100 using predictions. As such, a motion planning system of the vehicle 100 may compute a plan for slowing down and stopping at a particular distance from the candidate traffic light. Accordingly, the detection system 170 uses multi-stage modeling of multiple views to derive geometric relations and relevancy of traffic lights for a corresponding driving lane independent of map data, thereby improving accuracy and robustness.

Figure 5:
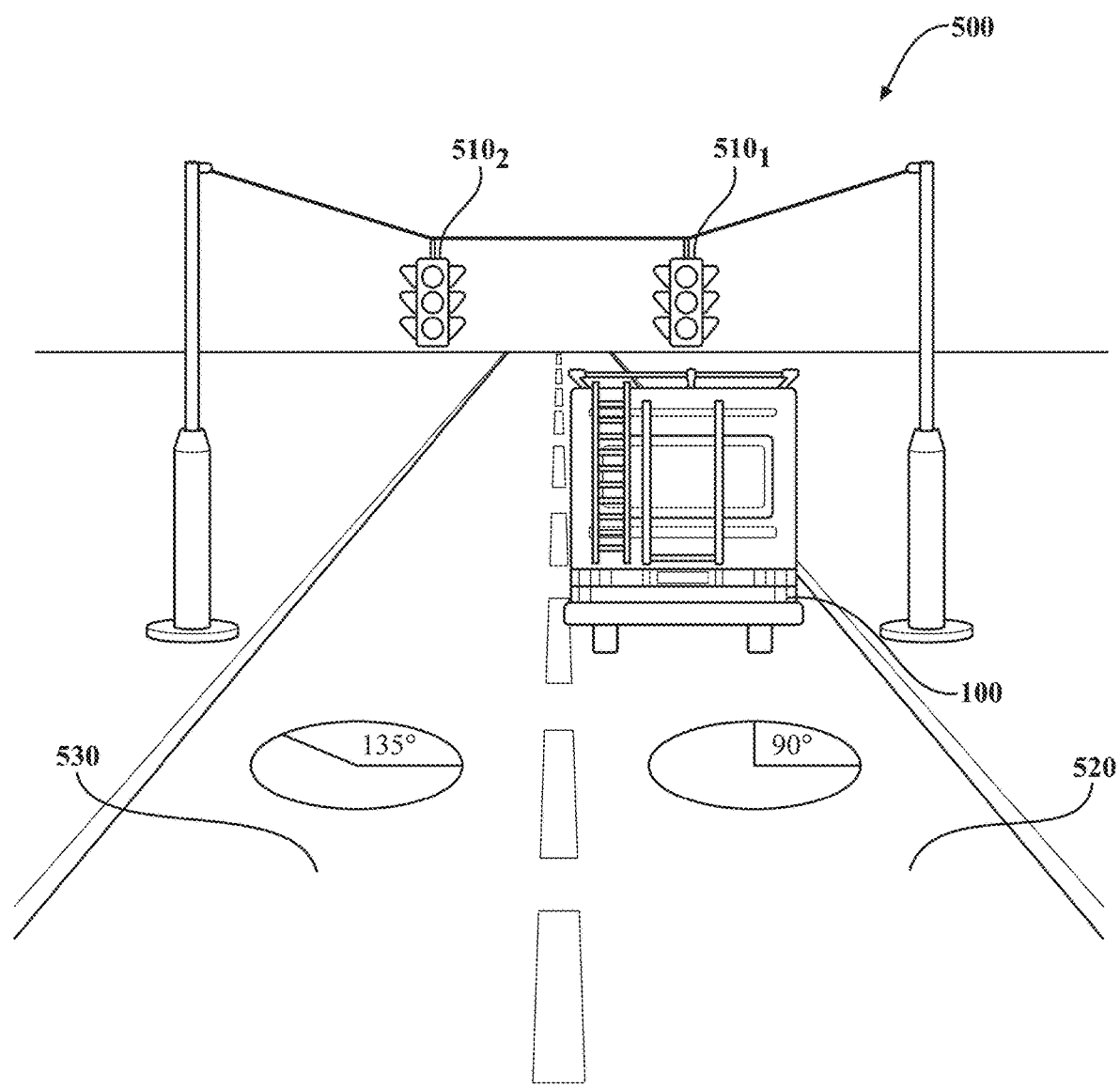
FIG. 5 illustrates an example of detected orientations for traffic lights relative to the driving lane using multiple cameras.

Now turning to FIG. 5, an example 500 of detected orientations for traffic lights relative to the driving lane using multiple cameras is illustrated. Here, the vehicle 100 is approaching the traffic lights 510$_1$ and 510$_2$ from the driving lane 520. The detection system 170 uses the first model to estimate from multiple images that the traffic light 510$_1$ has an orientation that is 90 degrees relative to a unit circle for the vehicle 100 and green. Similarly, the orientation computation for the traffic light 510$_2$ is 135 degrees. As such, the traffic light 510$_1$ may be scored as more relevant than the traffic light 510$_2$ by the second model due to orientation or facing degrees. In one approach, the detection system 170 detects the traffic light 510$_2$ at 0 degrees and 510$_1$ at 45 degrees when the vehicle 100 approaches on lane 530. Accordingly, the traffic light 510$_2$ may be scored as more relevant than the traffic light 510$_1$ in this driving scenario involving the driving lane 530 instead of the driving lane 520.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the detection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140 and, thus, may be partially or fully autonomous as defined by the society of automotive engineers (SAE) levels 0 to 5.

The processor(s) 110, the detection system 170, and/or the automated driving module(s) 160 can be operatively connected to communicate with the various vehicle systems 140 and/or individual components thereof. For example, returning to FIG. 1, the processor(s) 110, the detection system 170, and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140.

The processor(s) 110, the detection system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the detection system 170, and/or the automated driving module(s) 160 can control the direction and/or speed of the vehicle 100. The processor(s) 110, the detection system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A detection system to identify traffic lights for a driving lane, comprising:
a processor; and
a memory storing instructions that, when executed by the processor, cause the processor to:
estimate, by a first model using images from multiple cameras, positions and state confidences of the traffic lights corresponding to the driving lane of a vehicle;
aggregate, by a second model, the state confidences and a multi-view stereo composition from geometric representations associated with the positions of the traffic lights;
assign, by the second model according to the aggregation, a relevancy score computed for a candidate traffic light of the traffic lights to the driving lane; and
execute a task by the vehicle according to the relevancy score.

2. The detection system of claim 1, further including instructions to:
estimate, by the first model using the images, orientations and three-dimensional (3D) locations associated with the positions; and
generate, by the second model, the geometric representations of the traffic lights by projecting the orientations and the 3D locations to a 3D space.

3. The detection system of claim 2, further including instructions to:
compute a bounding box and a keypoint associated with the candidate traffic light to form the multi-view stereo composition using the second model, wherein the bounding box identifies a width and the keypoint a bulb of the candidate traffic light.

4. The detection system of claim 1, further including instructions to:
in response to detected characteristics of the candidate traffic light for the driving lane, train the second model by removing the relevancy score and assigning another one of the traffic lights as the candidate traffic light to the driving lane according to the aggregation.

5. The detection system of claim 1, wherein the images include occluded areas of the candidate traffic light from various views captured by a high-resolution camera and a fish-eye camera of the multiple cameras.

6. The detection system of claim 1, wherein the positions indicate angles between the traffic lights and the vehicle relative to the driving lane.

7. The detection system of claim 1, wherein the state confidences indicate probabilities of a color and a shape for bulbs of the traffic lights within the images.

8. The detection system of claim 1, wherein the task is one of an object detection task and a motion planning task.

9. A non-transitory computer-readable medium comprising:
instructions that when executed by a processor cause the processor to:
estimate, by a first model using images from multiple cameras, positions and state confidences of traffic lights corresponding to a driving lane of a vehicle;
aggregate, by a second model, the state confidences and a multi-view stereo composition from geometric representations associated with the positions of the traffic lights;
assign, by the second model according to the aggregation, a relevancy score computed for a candidate traffic light of the traffic lights to the driving lane; and
execute a task by the vehicle according to the relevancy score.

10. The non-transitory computer-readable medium of claim 9, further including instructions to:
estimate, by the first model using the images, orientations and three-dimensional (3D) locations associated with the positions; and
generate, by the second model, the geometric representations of the traffic lights by projecting the orientations and the 3D locations to a 3D space.

11. The non-transitory computer-readable medium of claim 10, further including instructions to:
compute a bounding box and a keypoint associated with the candidate traffic light to form the multi-view stereo composition using the second model, wherein the bounding box identifies a width and the keypoint a bulb of the candidate traffic light.

12. The non-transitory computer-readable medium of claim 9, further including instructions to:
in response to detected characteristics of the candidate traffic light for the driving lane, train the second model by removing the relevancy score and assigning another one of the traffic lights as the candidate traffic light to the driving lane according to the aggregation.

13. A method comprising:
estimating, by a first model using images from multiple cameras, positions and state confidences of traffic lights corresponding to a driving lane of a vehicle;
aggregating, by a second model, the state confidences and a multi-view stereo composition from geometric representations associated with the positions of the traffic lights;
assigning, by the second model according to the aggregating, a relevancy score computed for a candidate traffic light of the traffic lights to the driving lane; and
executing a task by the vehicle according to the relevancy score.

14. The method of claim 13, further comprising:
estimating, by the first model using the images, orientations and three-dimensional (3D) locations associated with the positions; and
generating, by the second model, the geometric representations of the traffic lights by projecting the orientations and the 3D locations to a 3D space.

15. The method of claim 14, further comprising computing a bounding box and a keypoint associated with the candidate traffic light to form the multi-view stereo composition using the second model, wherein the bounding box identifies a width and the keypoint a bulb of the candidate traffic light.

16. The method of claim 13, further comprising:
in response to detected characteristics of the candidate traffic light for the driving lane, training the second model by removing the relevancy score and assigning another one of the traffic lights as the candidate traffic light to the driving lane according to the aggregation.

17. The method of claim 13, wherein the images include occluded areas of the candidate traffic light from various views captured by a high-resolution camera and a fish-eye camera of the multiple cameras.

18. The method of claim 13, wherein the positions indicate angles between the traffic lights and the vehicle relative to the driving lane.

19. The method of claim 13, wherein the state confidences indicate probabilities of a color and a shape for bulbs of the traffic lights within the images.

20. The method of claim 13, wherein the task is one of an object detection task and a motion planning task.

* * * * *